United States Patent [19]
Lyon

[11] 3,965,936
[45] June 29, 1976

[54] SINGLE HANDLED MIXING VALVE

[75] Inventor: Jack K. Lyon, Pasadena, Calif.

[73] Assignee: Price Pfister Brass Mfg. Co., Pacoima, Calif.

[22] Filed: Nov. 20, 1974

[21] Appl. No.: 525,293

[52] U.S. Cl. .................. 137/625.17; 137/625.4
[51] Int. Cl.² ............................. F16K 19/00
[58] Field of Search ......... 137/625.4, 625.17, 636.2, 137/636.3, 636.4; 251/172, 170, 171

[56] References Cited
UNITED STATES PATENTS

| | | | |
|---|---|---|---|
| 2,639,116 | 5/1953 | Green | 137/625.17 |
| 3,023,769 | 3/1962 | Williams | 137/625.17 X |
| 3,035,612 | 5/1962 | Lyon | 137/625.4 X |
| 3,433,264 | 3/1969 | Parkinson | 137/625.17 |
| 3,476,149 | 11/1969 | Dornaus | 137/625.4 |
| 3,533,436 | 10/1970 | Parkison | 137/625.4 X |

Primary Examiner—Martin P. Schwadron
Assistant Examiner—Robert J. Miller
Attorney, Agent, or Firm—Flam & Flam

[57] ABSTRACT

A water mixing valve comprising a fixed valve seat and a valve plate which is slideable over the valve seat, means providing two modes of slideable movement of the valve plate with respect to the valve seat, one being a shifting movement and the other a rotational movement, and a porting arrangement in the valve seat and a cooperating system of passages in the valve plate, permitting shifting of the valve from a full on to a full off position at any desired mixture of hot and cold water, and permitting positioning of the valve to obtain changes in temperature of the water without change in volume, and changes in volume of the water without change in temperature.

15 Claims, 14 Drawing Figures

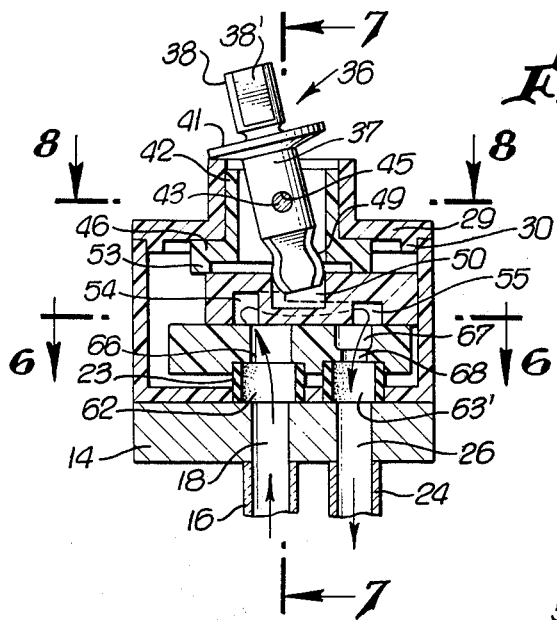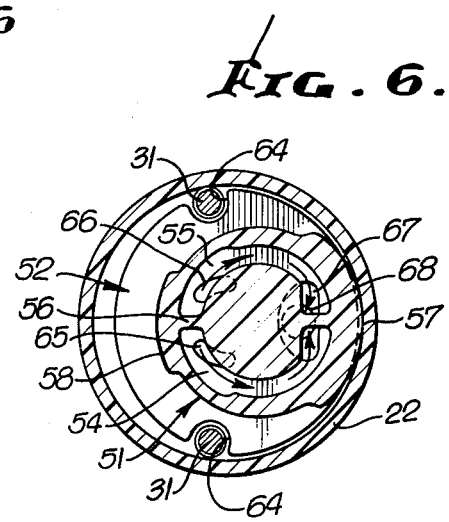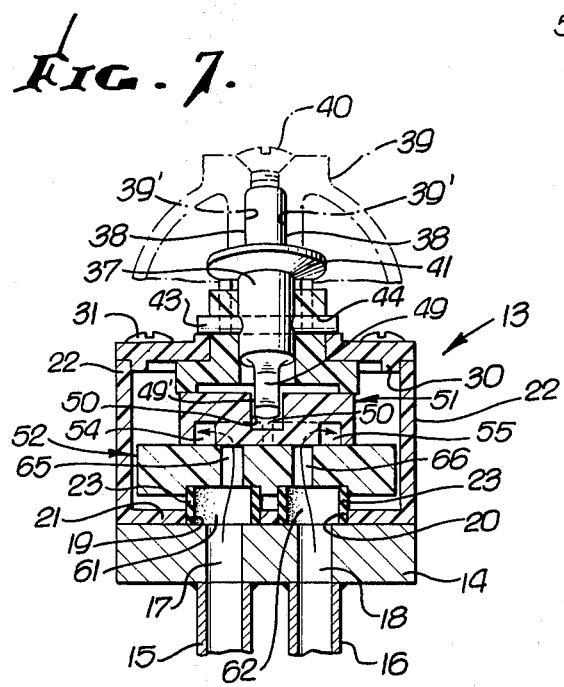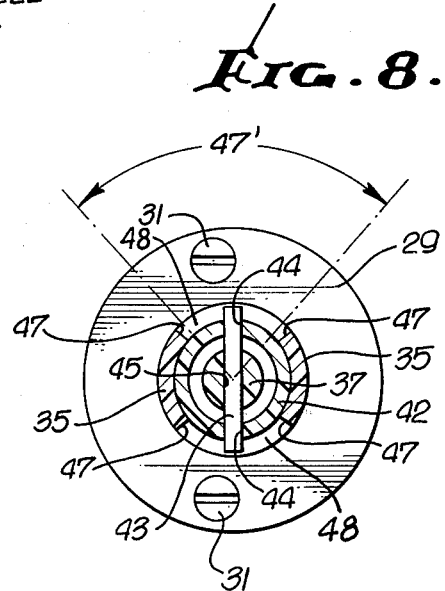

SINGLE HANDLED MIXING VALVE

BACKGROUND OF THE INVENTION

1. Field of the Invention

This invention relates to plumbing fixtures providing hot and cold water service for sinks, lavatories, laundry trays and the like. The invention particularly relates to single-handled mixing valves incorporated in such fixtures, e.g. as illustrated in Dornaus U.S. Pat. No. 3,324,884.

2. Description of the Prior Art

The above Dornaus patent discloses a rugged and practical single-handled mixing valve, but the problem presented by such valve is that it can only be brought back to a center off position. For more versatile operation and use, it is desirable to develop a valve of this type which makes possible the location of the off position at any point between the two stop positions so as to obtain a certain mix of water or a certain temperature, as soon as the valve is shifted from the off to an on position. A structure of this character is shown and described in U.S. Pat. No. 3,533,436. This structure, however, is bulky and complicated.

The chief object of the present invention is to provide a compact and simple single-handled mixing valve which is provided with a suitable porting system which permits such location of the off position at any point between the full cold and the full hot positions and which permits change in temperature of the water discharged from the valve without change in volume, or change in volume of water discharged without change in temperature.

SUMMARY OF THE INVENTION

The above objects are achieved according to the invention by the provision of a unique recess arrangement in a substantially flat valve seat and a flat valve plate which is movable and slideable over the valve seat. Means are provided, including a shiftable and rotatable pin connected to the valve plate, for actuation by a handle, to cause two modes of movement of the valve plate with respect to the valve seat, one movement being a controlled shifting movement to the on and off positions, which varies the volume of the water discharged, and the other being a controlled angular or rotational movement of the valve plate which controls the relative proportions of hot and cold water which are mixed and discharged, that is the control of the temperature of the water.

The valve seat has a plurality of control ports and a mixing port, and the valve plate is provided with a plurality of cooperating passages, whereby movement of the valve plate with respect to the valve seat in each of the two modes of movement noted above, affords a desired registry or non-registry of one or more of the control ports with one or more of the cooperating passages in the valve plate, which is in communication with the mixing port.

The valve structure of the invention makes possible the location of the off position of the valve at any point between the two stop positions corresponding to full hot and full cold, to obtain any desired mixture of hot and cold water as soon as the valve is shifted from the off to an on position. The shifting of the valve plate permits an adjustment of volume from full off to full on, and vice versa, at any position to provide water at a given temperature. The rotation of the valve plate permits movement of the valve plate from the full hot to the full cold position and to intermediate positions therebetween, without any change in volume. These results are achieved by the above noted provision of the two modes of movement of the valve plates, either shifting of the valve plate through its center or rotation of the valve plate about its center.

In addition to the above noted advantages, the valve of the present invention is comprised of fewer components and is simpler than, for example, prior art valves such as that of the above Dornaus patent. The valve seat is mounted on a resilient support, and thereby reduces frictional wear between the movable contacting surfaces of the valve plate and valve seat, and also reduces valve shock. The device of the present invention is provided with simple angular stops on the outside of the valve, which affords a more rugged design and prevents fractures of contacting component parts during constant operation of the valve. The structural design of the invention valve with its porting and cooperating passage arrangement also prevents noise resulting from cross flow at intermediate positions of the valve.

BRIEF DESCRIPTION OF THE DRAWINGS

A detailed description of the invention will be made with reference to the accompanying drawings, wherein like numerals designate corresponding parts in the several figures.

FIG. 5 is a vertical sectional view similar to FIG. 2, showing the valve in a fully open position;

FIG. 6 is a sectional view taken along a plane corresponding to line 6—6 of FIG. 5;

FIG. 7 is a vertical sectional view taken along a plane corresponding to line 7—7 of FIG. 5;

FIG. 8 is a horizontal sectional view taken along a plane corresponding to line 8—8 of FIG. 5;

DESCRIPTION OF THE PREFERRED EMBODIMENTS

The following detailed description is of the best presently contemplated modes of carrying out the invention. This description is not to be taken in a limiting sense, but is made merely for the purpose of illustrating the general principles of the invention since the scope of the invention best is defined by the appended claims.

Figure 1:
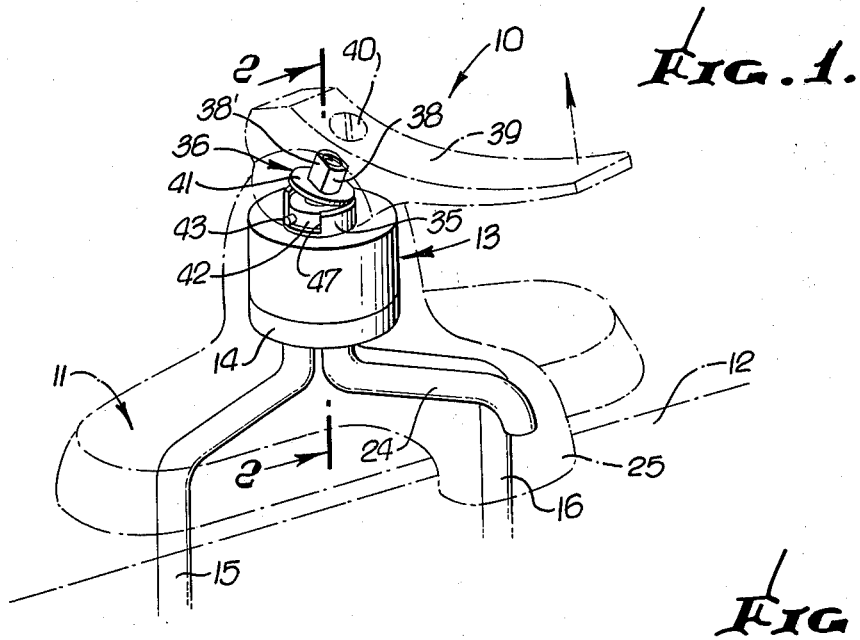
FIG. 1 is a front perspective view of a faucet construction incorporating the valve of the present invention.

By way of example, the valve structure is shown embodied in a faucet structure indicated generally at 10 in FIG. 1, and having a housing 11 adapted to be mounted in the deck surrounding a sink or lavatory, indicated at 12. In the embodiment of the invention shown, there are two main stationary parts, a valve body 13 and a fitting 14 supporting the valve body 13. The fitting 14 can be made of cast brass or other suitable material, and the valve body 13 and its internal parts as described below can be made of plastics, as well as ceramics or other suitable material including cast brass. The fitting 14 is provided with a pair of depending conduits 15 and 16 for connection with hot and cold water supply conduits (not shown), respectively.

Figure 2:
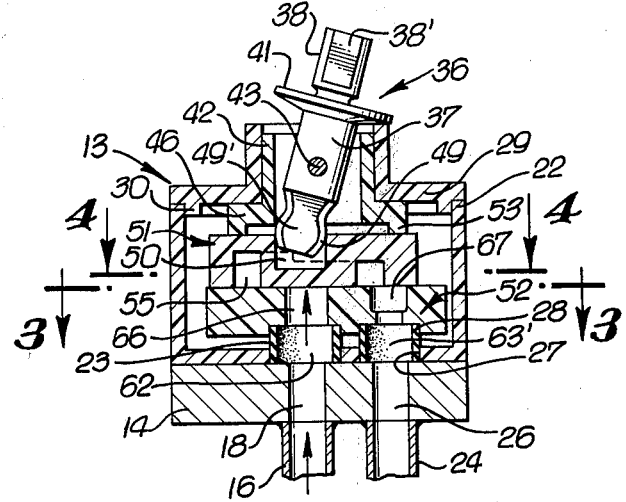
FIG. 2 is a vertical section taken along a plane corresponding to line 2—2 of FIG. 1 and showing the valve in closed position.
Figure 13:
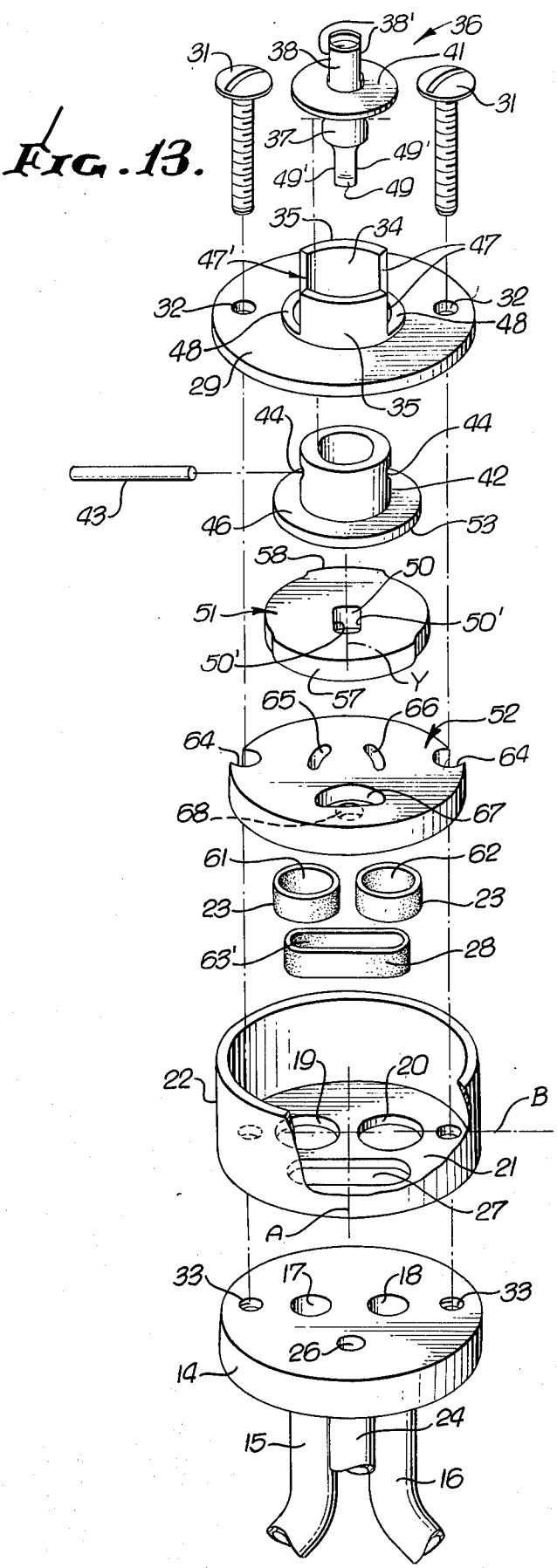
FIG. 13 is an exploded pictorial view showing the operating parts of the valve mechanism.

Viewing FIGS. 2, 7 and 13, the fitting 14 is provided with hot and cold inlet passages 17 and 18 each leading from the respective supply conduits 15 and 16, and registering with enlarged spaced ports or holes 19 and 20, respectively, in the bottom 21 of a cup 22 which forms the housing for the valve body 13. The holes 19 and 20 in the bottom of cup 22 are substantially diametrically opposed to each other on opposite sides of the bottom 21 of the cup, and accommodate resilient ring seals 23.

The fitting 14 is also provided with a conduit 24 which provides the discharge outlet for the water from the valve through the faucet 25. Outlet conduit 24 communicates with a hole 26 in the fitting 14, the upper end of the hole 26 opening into an elongated aperture 27 in the bottom of cup 22. Referring particularly to FIG. 13, it will be noted that the elongated aperture 27 is disposed adjacent one side of both of the inlet holes 19 and 20 in the bottom of cup 22, and symmetrically disposed with respect to holes 19 and 20, and more specifically with respect to a diameter A of the cup 22, which passes between holes 19 and 20 and which is perpendicular to a line B passing through the centers of such holes. The elongated aperture 27 accommodates a resilient similarly shaped ring seal 28.

A cover 29 is positioned on the cup 22, the cover 29 being provided with a peripheral depending flange 30 which abuts the inner upper surface of the cup, for positioning the cover thereon. The cover is fixed in position by means of a pair of screws 31 which pass through substantially diametrically spaced holes 32 in the cover and are threaded into threaded holes 33 in the fitting 14.

The cover 29 has a central aperture 34, adjacent which are provided a pair of upwardly extending arcuate flanges 35, as best seen in FIG. 13. A valve actuation assembly 36 is mounted for supports on the cover 29, such assembly including an actuating member in the form of an arm or pin 37 having mounted at its upper end a fitting 38 having opposite flat sides 38', which receives thereon a female mating portion 39' depending from the inner end of a handle 39, such mating portion of the handle being connected to the fitting 38 by a screw 40 which is threaded into the fitting.

The pin 37 has mounted thereon below the fitting 38 a circular flange 41. The pin 37 is received for pivotal mounting within a sleeve 42 on a transverse pin 43 which is slidably received within diametrically opposed holes 44 in sleeve 43 and within a diametrically positioned hole 45 passing transversely through the pin 37 (see also FIG. 8). The sleeve 42 carries at its lower end an outwardly extending peripheral flange 46, the external diameter of the sleeve 42 being slightly less than the diameter of the hole 34 in cover 29. The valve actuating assembly 36 and the sleeve 42 are mounted on the cover 29 by passing the sleeve 42 through the hole 34 in cover 29, and within the arcuate flanges 35 on the cover 29, with the lower flange 46 of sleeve 42 substantially in contact with the lower surface of the cover 29 adjacent hole 34, passing the pin 37 through the sleeve 42, and then inserting the transverse pin 43 through holes 44 of the sleeve 42 and through the transverse hole 45 in the pin 37. Pin 37 is thus mounted on sleeve 42, which can be rotated within arcuate flanges 35 serving as bearings for the sleeve.

When the valve actuation assembly 36 including the pin 37 is so mounted, the pin 37 carried on sleeve 42 can be rotated by means of the handle 39 through an arc corresponding to the distance between adjacent edges 47 of the adjacent arcuate flanges 35, permitted by angular or rotational movement of the opposite ends of the transverse pin 43 in the spaces 47' between such adjacent edges 47, which serve as limit stops for the pin 43. The pin 37 and the mounting sleeve 42 are mounting sleeve 42 are maintained in position against axial movement by slideable contact of the opposite ends of transverse pin 43 with diametrically opposed arcuate ridges 48 (FIGS. 8 and 13) provided around the hole 34 on cover 29 and between the adjacent outer edges 47 of the upstanding arcuate flanges 35, and by slideable contact of the upper surface of flange 46 of sleeve 42, with the adjacent lower surface of the cover 29.

The pin 37 of the valve actuating assembly 36, in addition to having the above-noted controlled amount of rotation, also can be tilted in any angular or rotated position thereof, either backward or forward from a true vertical position, an amount limited by contact of the flange 41 against the upper edge of one or the other of the respective arcuate flanges 35, forming stops for member 41.

The pin 37 carries at its lower end a projection or key member 49 having opposite flat parallel sides 49' (see FIG. 7), which is received in an elongated mating or locking groove 50 having flat parallel sides 50', in the center of the upper surface of a valve plate 51. The valve plate 51 is essentially circular in shape and the major axis Y (FIG. 13) of the elongated locking groove 50 passes essentially through the center of the valve plate. It will thus be seen that valve plate 51 is subject to a controlled degree of rotation about its center, by rotation of the pin 37 through an arcuate or angular motion controlled by contact of the transverse pins 43 with the adjacent edges or stops 47 of the arcuate flanges 29, as noted above. Further, the key member 49 carried by pin 37 is slideable in groove 50 in a vertical plane passing through the major central axis Y of such groove, viewing FIGS. 7 and 13. Thus, the valve plate 51 is subject to a controlled amount of shifting or lateral motion along the central axis Y thereof by shifting of the latch member 49 in groove 50 along a center line corresponding to the major axis Y of the elongated locking groove 50, as a result of the tilting of pin 37 from one extreme position wherein the flange 41 carried by the pin is in contact with the upper edge of one of the arcuate flanges 35, as seen in FIG. 2, to the opposite extreme position wherein the flange 41 is in contact with the upper edge of the other arcuate flange 35, as seen in FIG. 5.

The valve plate 51 is supported for the above-noted limited angular and lateral motions on a fixed valve seat 52. Thus, in the operative assembled position as illustrated in FIG. 2, the lower surface of the valve plate 51 is angularly and laterally slideable for the controlled amounts noted above, over the upper surface of the valve seat 52, while the upper surface of the valve plate is slideable on the lower surface of a peripheral ring 53 depending from the lower surface of flange 46 on the sleeve 42.

Figure 4:
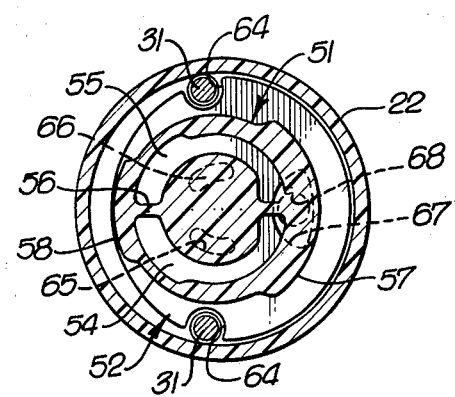
FIG. 4 is a horizontal sectional view taken along a plane corresponding to line 4—4 of FIG. 2.

Referring to FIG. 4, it will be noted that there is provided in the lower surface of the valve plate 51 a circular groove means in the form of a pair of substantially 180° arcuate grooves or passages 54 and 55, the adjacent ends of such passages being separated by a septum 56, to prevent cross flow of fluid from one of said passages to the other. It will also be noted that the valve plate 51 has a relatively long arcuate end portion 57 for substantial mating contact with the interior surface of the cup 22 in one extreme shifted or lateral position of the valve plate (the open position of the valve), as seen, for example, in FIG. 6, and a shorter opposite arcuate end portion 58 for substantially mating with the interior peripheral surface of the cup 22 at the opposite extreme lateral position of the valve plate 51 (the closed position of the valve), as illustrated in FIG. 4.

Figure 3:
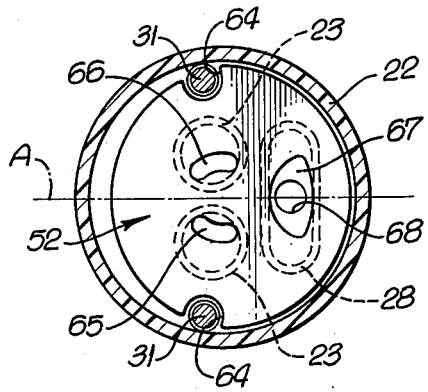
FIG. 3 is a horizontal sectional view taken along a plane corresponding to line 3—3 of FIG. 2.
Figure 14:
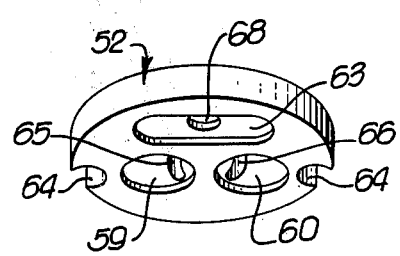
FIG. 14 is a plan view showing the opposite side of the valve seat from that shown on FIG. 13.

The valve seat 52 has formed on the lower surface thereof a pair of shallow circular cavities 59 and 60 (see FIGS. 2, 3 and 14), such cavities being of the same diameter as the holes 19 and 20 in the bottom of cup 22. The cavities 59 and 60 are disposed adjacent each other substantially on one side of the bottom of the valve seat 52, the center of the bottom of the valve seat being disposed between such cavities. It will be noted that the shallow cavities 59 and 60 are disposed in the same relation to each other in the bottom of valve plate 52, as the holes 19 and 20, respectively, in the bottom of cup 22. The cavities 59 and 60 are in alignment with holes 19 and 20, and receive the upper ends of the rings 23 to form a pair of sealed passages 61 and 62 communicating with the holes 17 and 18, respectively, in the fitting 14. The lower surface of the valve seat 52 also is provided therein with an elongated shallow cavity 63 on the opposite side of the bottom of cup 22 from cavities 59 and 60, the elongated cavity 63 having substantially the same depth as the round cavities 59 and 60. It is noted that the elongated cavity 63 is disposed symmetrically with respect to the circular cavities 59 and 60, and elongated cavity 63 is of the same shape and size as, and is positioned in alignment with, the elongated hole 27 in the bottom 21 of cup 22. Thus, the bottom of the valve seat 52 with the circular shallow cavities 59 and 60 and the elongated shallow cavity 63, is a mirror image of the bottom 21 of cup 22, containing the circular holes 19 and 20 and the elongated hole 27. The upper end of the ring seal 28 is received in the elongated cavity 63 of valve seat 52, to form a passage 63' of elongated cross-section, communicating with hole 26 in the fitting 14.

The valve seat 52 is fixed in the position described above by passage of the clamping screws 31 through suitably aligned notches 64 (see FIG. 3) provided substantially opposite each other in the peripheral surface of the valve seat 52. Thus, it will be seen, for example in FIG. 2, that the valve seat 52 is essentially supported on the upper ends of the ring seals 23 and the ring seal 28, forming an essentially resilient support for the valve seat and permitting tight but slideable engagement of the lower surface of the valve plate 51 with the upper surface of the valve seat 52, as noted above, with minimum wear between the relatively sliding contacting lower surface of valve plate 51 and upper surface of valve seat 52.

Figure 9:
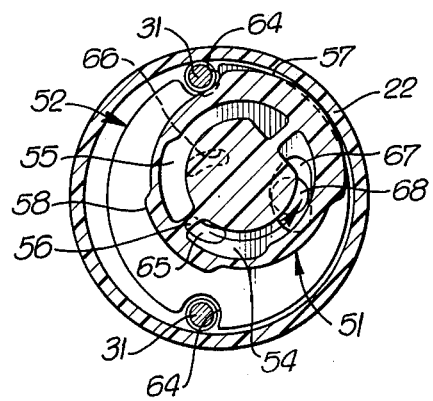
FIG. 9 is a view similar to FIG. 6, but showing the valve open to the full hot position.
Figure 10:
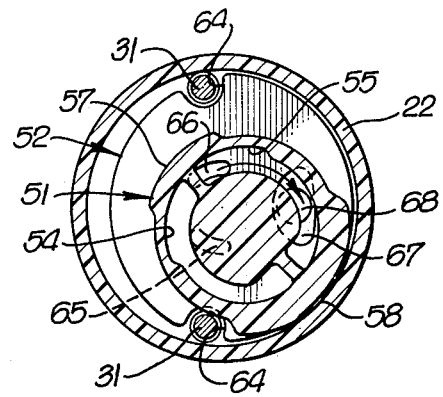
FIG. 10 is a view similar to FIG. 6, but showing the valve open to the full cold position.

The upper surface of the valve seat 52 is provided with a pair of arcuately shaped ports 65 and 66 (see FIGS. 3 and 13) disposed above the shallow cavities 59 and 60, respectively, in the bottom of the valve seat, the bottom of the ports 65 and 66 intersecting and communicating with cavities 59 and 60, respectively. The arcuately shaped ports 65 and 66 diverge outwardly from each other, and are thus designed for communication at the top of such ports also with the inner ends of the arcuate grooves or passages 54 and 55, respectively, in the bottom of the valve plate 51, when such plate is shifted and/or rotated into one or more positions, as described below, for registration of one or both of the respective arcuate passages 54 and 55 with one or both of ports 65 and 66, e.g., as seen in FIGS. 6, 9 and 10. Thus the arcuate grooves or passages 54 and 55 in valve plate 51 function as flow control means cooperating with ports 65 and 66 in the valve seat 52, to control the amount of flow through ports 65 and 66 into the passages 54 and 55, dependent on the position of the moveable valve plate 51.

Also provided in the upper surface of the valve seat 52 and symmetrically disposed opposite the arcuately diverging ports 65 and 66 is an essentially oval-shaped mixing cavity 67 centrally positioned in alignment with the elongated cavity 63 in the bottom of the valve seat. A circular hole 68 intersects and communicates with the upper mixing cavity 67 and the lower cavity 63. The elongated lower cavity 63 which opens into the elongated passage 63' also functions as a mixing chamber for the water discharged therein from cavity 67. Mixing cavity 67 is located adjacent to the outer ends of the grooves or passages 54 and 55 in the lower face of the valve plate 51, so that in any position of the valve plate 51, one or both of the adjacent outer ends or end portions of such grooves opposite the ends of the grooves in communication with the ports 65 and 66, are registered for communication with the mixing cavity 67.

When the handle 39 of the valve is pushed down, pin 37 is tilted on pivot pin 43 to the limit of tilting motion of pin 37 by contact of the flange 41 with the upper edge of one of the arcuate flanges 35. As seen in FIGS. 1 and 2, the top of pin 37 is tilted to its extreme right position as illustrated in FIG. 2, causing the latch member 49 at the lower end of the pin 37 to shift or move the valve plate 51 to its extreme left position shown in FIG. 1. In this position, as seen in FIG. 4, it will be noted that the ports 65 and 66 are completely out of registration with the arcuate passages 54 and 55 in the lower surface of the valve plate, and hence neither the hot water passing into the control port 65 from conduit 15, via hole 17 and the passage 61, nor the cold water passing into control port 66 from conduit 16, via hole 18 and the passage 62, can pass into grooves 54 and 55 and to the discharge conduit 24, and the valve is hence in its off position.

It will be noted that in the tilted off position of the valve, the transverse pin 43 rotatable on sleeve 42 is in its central position between adjacent side edges or stops 47 of the adjacent arcuate flanges 35. Thus, while the pin 37 is in such extreme tilted off position, and with the handle 39 is its lowermost position, handle 39 can be manipulated to rotate the pin 37 about its center either clockwise or counterclockwise an angular amount until the pin 43 strikes either of the adjacent stops 47 on the adjacent arcuate flanges 35. During such rotation of the valve plate 51 in either clockwise or counterclockwise from its position shown in FIG. 4, it will be noted that the arcuate passages 54 and 55 in the valve plate 51 are simply rotated from their positions shown in FIG. 4, and hence will remain unregistered with respect to the ports 65 and 66, which in the closed position of the valve, remain disposed between the passages 54 and 55, and out of registration therewith. This means that the invention device permits the location of the off-position of the valve at any point between the two stop positions defined by contact of the pin 43 with the adjacent vertical edges or stops 47 of adjacent arcuate flanges 35.

Now when the handle 39 is lifted from the center off position of the valve shown in FIGS. 1 to 4, to tilt the pin 37 back, that is counterclockwise on pivot pin 43, viewing FIG. 2, to the limit of its movement in this direction, by contact of the flange 41 with the upper edge of the other arcuate flange 35 at the left, viewing FIG. 5, the latch member 49 at the lower end of the pin correspondingly shifts or moves the valve plate 51 in a straight line along its major central axis Y to its extreme right position. In this fully opened centered position of the valve, it will be noted, viewing FIG. 6, that about 50% of the opening in each of the ports 65 and 66 is in communication with the inner end of the respective arcuate passages 54 and 55 in the lower surface of the valve plate 51, and hence an equal amount of hot water is received in passage 54 from port 65, via hot water conduit 15 and passages 17 and 61, with respect to the amount of cold water received in passages 55 from port 66, via the cold water conduit 16, and passages 18 and 62. The equal amounts of hot and cold water in passages 54 and 55 are discharged at the opposite ends of such passages into the mixing cavity 67 in valve seat 52, are mixed therein to provide water of intermediate temperature, and such water passes through the hole 68 downwardly into the elongated cavity 63 in the bottom of the valve seat and via passages 62' and hole 26 into the discharge conduit 24 and out the faucet 25.

It will be understood that at any intermediate position between the centered full off position of the valve illustrated in FIG. 4, to the centered full on position illustrated in FIG. 6, the volume of water discharged will vary and gradually increase to the maximum volume discharged at the full open position illustrated in FIG. 6, but the temperature of the water will remain constant since at all such intermediate centered positions of the valve, as well as in its fully open position, equal amounts of hot and cold water will pass from the ports 65 and 66 into the receiving passages 54 and 55, respectively.

If at the full centered on-position shown in FIG. 6, the handle 39 as viewed in FIG. 1 is rotated counterclockwise to its extreme position, thus likewise rotating pin 37 and sleeve 42 counterclockwise, viewing FIG. 8, until the transverse pin 43 strikes the stops formed by the vertical edges 47 of the arcuate flanges 35 shown in FIG. 1, the valve plate 51 is now also rotated counterclockwise about its center to the position illustrated in FIG. 9. In this position it will be seen that substantially the entire area of the port 65 in the valve seat 52 is in communication with the inner end of the passage 54 in the valve plate 51, and that the port 66 is completely unregistered with the adjacent arcuate passage 55 and is not in communication therewith. Thus it is seen that a full volume of hot water is discharged into the passage 54 from port 65, with no cold water being discharged from port 66 into the passage 55. Hence, only hot water will be discharged from passage 54, into cavity 67, hole 68 and the elongated passage 62' into the discharge outlet 24 and out of the faucet. On the other hand, if the handle 39 in FIG. 1 is now rotated clockwise to the extreme limit of rotation, to thus also rotate pin 37 and sleeve 42 clockwise, viewing FIG. 8, until the transverse pin 43 strikes the opposite stops or edges 47 of the arcuate flanges 35, the valve plate 51 is now also rotated clockwise about its center from its position in FIG. 9 to the position shown in FIG. 10. In this latter position, it will be seen that the major portion of the area of the port 66 is open to and in communication with the inner end of the adjacent arcuate passage 55, while the other port 65 is entirely out of registry with the adjacent arcuate passage 54, and hence only a full volume of cold water is passed from the control orifice 66 into the passage 55, no hot water being introduced from orifice 65 into passage 54. Thus, only cold water is discharged from the outer end of the passage 55 into the shallow mixing cavity 67 and discharged via holes 68 and 62' through discharge conduit 24 and out the faucet.

Thus, viewing FIGS. 9 and 10 it will be seen that the valve can be rotated from a full hot position as illustrated in FIG. 9 to a full cold position as illustrated in FIG. 10, or vice versa, without changing the volume of water discharged.

Figure 11:
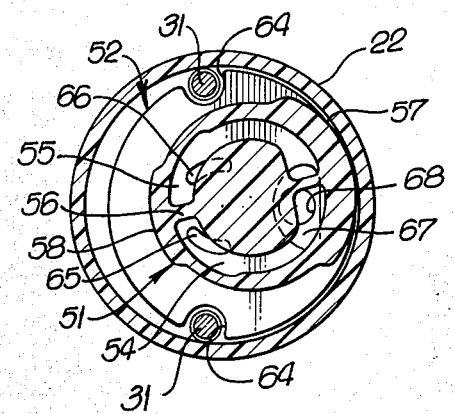
FIG. 11 is a view similar to FIG. 6, showing the valve fully open, but in a position to provide a mixture of one-third cold and two-thirds hot water.

FIG. 11 illustrates an intermediate position of the valve between the full hot position illustrated in FIG. 9 and the full cold position illustrated in FIG. 10 while still obtaining the full maximum volume of water discharged. Thus, in FIG. 11 the handle 39, in the fully open position of FIGS. 9 and 10 has been rotated to cause rotation of pin 37 and valve plate 51 to an intermediate position, with the transverse pin 43 disposed between adjacent stops 47 on the arcuate flanges 35. In the position of the valve illustrated in FIG. 11, the handle 39 is still in its fully raised position with the full tilting of the upper portion of the pin 37 to the left as illustrated in FIG. 5. In the position of the valve plate 51 shown in FIG. 11, it will be noted that a substantial portion of the area of the port 65 is in communication with the inner end of arcuate passage 54 while a much smaller area of port 66 is open to and in communication with the inner end of the arcuate passage 55. In this position, about twice the area of port 65 is open to passage 54, as compared to the area of port 66 open to passage 55. Since this means that twice the volume of hot water is discharged from passage 54 into the mixing cavity 67, as compared to the volume of cold water discharged from passage 55 into the mixing cavity 67, the total volume of water discharged will be comprised of ⅔ hot and ⅓ cold water, so that the water discharged is warm or relatively hot water delivered in full volume equal to the full volume of hot or cold water delivered by positioning the valve as illustrated in FIGS. 9 and 10.

Figure 12:
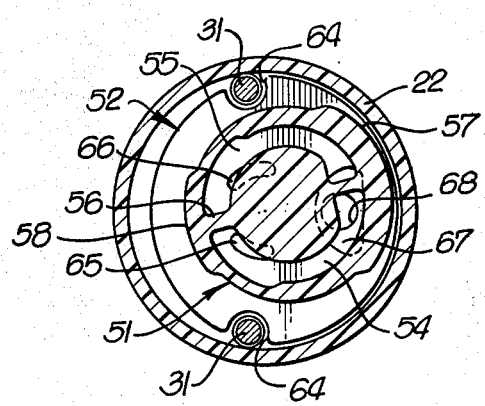
FIG. 12 is a view similar to FIG. 11, but showing the valve in a half-closed position.

FIG. 12 illustrates the positioning of the valve so that it is half closed while still delivering the same ratio of ⅔ hot to ⅓ cold water, as in the case of the position of the valve in FIG. 11, the temperature of the water delivered from the positions of FIGS. 11 and 12 being the same. To attain the position illustrated in FIG. 12, from the position shown in FIG. 11, the handle 39 is lowered an amount to a position intermediate its extreme upper and lower positions, corresponding to a tilting of the actuating pin 37 an amount intermediate the positions of FIG. 5 and FIG. 1. This causes a shifting of the valve plate 51 in a straight line along its central axis Y, and to the left from its position in FIG. 11 to that of FIG. 12.

In such position of the valve plate, the valve is now half closed so that only ½ the volume of water is discharged from the faucet as in the fully open positions of the valve illustrated in FIGS. 6, 9, 10 and 11. However, the angular position of the valve proceeding from the position of FIG. 11 to that of FIG. 12 has remained the same. Thus, although a smaller area of each of the ports 65 and 66 is now in communication with the inner ends of their respective discharge passage 54 and 55, due to the above noted shifting of valve plate 51 to the left from its position in FIG. 11, the same ratio of areas of ports 65 and 66 are open to discharge passages 54 and 55, as in the position of the valve illustrated in FIG. 11. That is, twice the area of port 65 is open to its discharge passage 54 as compared to the area of port 66 open to its discharge passage 55. Hence, again, twice the volume of hot water will pass through passage 54 and be discharged into the mixing cavity 67, as the volume of cold water discharged from passage 55 into the mixing cavity 67, so that again, as in the position of FIG. 11, about ⅔ of the total volume of water discharged is hot water and ½ cold water, corresponding to the delivery of water at the same temperature as for the position of the valve in FIG. 11, but at about half the volume.

From the foregoing, it is seen that the invention provides a relatively simple and durable valve formed of relatively few components but which operates efficiently to provide a full on or a full off position at any point between the full hot and full cold stop positions and to deliver any desired mixtures of hot and cold water between full cold and full hot when the valve is changed from an off to an on position, and which will permit positioning of the valve in any position from full on to full off, or vice versa, without changing the temperature of the water, or from full hot to full cold without changing volume.

Intending to claim all novel, useful and unobvious features shown or described, the applicant claims:

1. In a valve structure, a valve body having wall means defining a chamber, a flat valve seat in said chamber, means forming a pair of inlet ports in said seat and opening into said chamber, a valve plate having a surface slideable on said seat, flow control means in said valve plate cooperable with said inlet ports for determining the relative opening of said ports and the combined volume of flow therethrough, said flow control means including a substantally circular groove means on said valve plate surface, actuating means for moving said valve plate, means confining said valve plate for sliding movement on said valve seat, a connection between said valve plate and said actuating means, means associated with said actuating means for shifting said valve plate laterally along a central axis of said valve plate a controlled amount from an off position of said valve in which said groove means circumscribes said inlet ports with said inlet ports adjacent a part of said groove means and wherein said flow control means prevents flow through said inlet ports, to a full-on position in which said groove means partially registers with said inlet ports and wherein said flow control means permits a miximum combined flow through said inlet ports, with a varying combined volume of flow through said ports permitted by said flow control means at positions of said valve plate between said off position and said full-on position, a first stop means limiting said lateral motion of said valve plate to said extreme off and full-on positions, means associated with said actuating means for rotating said valve plate about its axis through a predetermined arc, and a second stop means limiting rotational motion of said valve plate to extreme positions of said arc wherein said flow control means permits flow only through one or the other of said inlet ports, with varying proportions of flow through said respective inlet ports permitted by said flow control means at angular positions of said valve plate between said extreme stop positions of said valve plate in said arc, means forming an outlet port in said valve seat opposite said groove means part and in continuous communication with said groove means, said off position of said valve being located at any rotational position of said valve plate between said extreme positions of said arc defined by said second stop means.

2. A valve structure as defined in claim 1, said groove means comprising a pair of complementary grooves separated at their ends, said grooves being respectively cooperable with said inlet ports.

3. In a valve structure, a valve body having wall means defining a chamber, a valve seat in said chamber, means forming a pair of inlet ports in said seat and opening into said chamber, a valve plate slideable on said seat, flow control means in said valve plate cooperable with said inlet ports for determining the relative opening of said ports and the combined volume of flow therethrough, actuating means for moving said valve plate, means confining said valve plate for sliding movement on said valve seat, a connection between said valve plate and said actuating means, means associated with said actuating means for shifting said valve plate laterally along a central axis of said valve plate a controlled amount from an off position of said valve wherein said flow control means prevents flow through said inlet ports, to a full-on position wherein said flow control means permits a maximum combined flow through said inlet ports, with a varying combined volume of flow through said ports permitted by said flow control means at positions of said valve plate between said off position and said full-on position, a first stop means limiting said lateral motion of said valve plate to said extreme off and full-on positions, means associated with said actuating means for rotating said valve plate about its axis through a predetermined arc, and a second stop means limiting rotational motion of said valve plate to extreme positions of said arc wherein said flow control means permits flow only through one or the other of said inlet ports, with varying proportions of flow through said respective inlet ports permitted by said flow control means at angular positions of said valve plate between said extreme stop positions of said valve plate in said arc, said flow control means in the said valve plate being arranged to communicate with said inlet ports in said valve seat, means forming an outlet port in said valve seat and opening into said chamber, said flow control means being arranged to communicate with said outlet port means forming an outlet from said chamber and communicating with said outlet port, said flow control means comprising a pair of separate flow control passages in said valve plate, said inlet ports in said valve seat comprising a pair of arcuately shaped outwardly divergent ports, said control passages in said valve plate comprising a pair of arcuate grooves in the bottom of said valve plate, the inner ends of said arcuate grooves being arranged to selectively communicate with one or both of said arcuate inlet ports over varying areas of said respective inlet ports when said valve plate is shifted away from its off-position, the outer ends of said arcuate grooves being positioned for communication with said outlet port in said valve seat.

4. A valve structure as defined in claim 3, said arcuate grooves each being about 180° arcuate grooves disposed opposite each other, the adjacent ends of said arcuate grooves being separated to prevent cross-flow from one of said arcuate grooves to the other, said arcuate inlet ports being positioned within and out of communication with said arcuate grooves in said off-position of said valve and at any angular position of said valve plate in said off-position of said valve.

5. A valve structure as defined in claim 1, said means communicating said inlets to said chamber with said inlet ports in said valve seat comprising a pair of resilient ring seals forming passages between said inlets and said inlet ports, and said means communicating said outlet from said chamber and said outlet port in said valve seat comprising a resilient seal forming a passage between said outlet and said outlet port, said valve seat being mounted on said resilient seals.

6. A valve structure as defined in claim 4, said means communicating said inlets to said chamber with said inlet ports in said valve seat comprising a pair of resilient ring seals forming passages between said inlets and said inlet ports, and said means communicating said outlet from said chamber and said chamber and said outlet port in said valve seat comprising a resilient seal forming a passage between said outlet and said outlet port, said valve seat being mounted on said resilient seals.

7. A valve structure as defined in claim 6, said actuating means for moving said valve plate comprising an actuating pin, said pin being tiltable and rotatable, said connection between said actuating means and said valve plate including a groove in said valve plate, the lower end of said actuating pin disposed in said groove for slideable movement therein and permitting shifting of said valve plate laterally along said central axis of said valve plate in response to tilting of said pin, said valve plate being rotatable on said actuating pin in response to rotation thereof, said means for shifting said valve plate laterally comprising a pivot pin, said actuating pin being mounted for pivotal motion on said pivot pin to tilt said actuating pin in a vertical plane passing through the central axis of said valve plate, and said means for rotating said valve plate including a rotatable member, said pivot pin being mounted on said rotatable member for rotation therewith, and means for mounting said member for rotation on said valve body.

8. A valve structure as defined in claim 7, said rotatable member comprising a sleeve, said actuating pin extending through said sleeve, said pivot pin being mounted on and passing transversely through said sleeve, said first stop means positioned on said valve body adjacent said actuating pin and limiting said tilting motion of said last-mentioned pin, and said second stop means positioned on said valve body and cooperating with said transverse pivot pin to limit the rotation of said actuating pin on said sleeve.

9. A valve structure as defined in claim 8, said first and second stop means comprising a pair of vertically extending spaced arcuate flanges positioned diametrically opposite each other on said valve body around said sleeve, and including a flange mounted on said actuating pin above said arcuate flanges said flange on said actuating pin abutting the upper edges of said arcuate flanges at the respective opposite limits of tilting motion of said actuating pin, and said transverse pivot pin abutting the side edges of said arcuate flanges at the respective opposite limits of rotation of said sleeve and said actuating pin pivotally mounted on said sleeve.

10. In a valve structure, a valve body including a cup defining a chamber, a fitting supporting said cup, a cover positioned on said cup, a pair of inlet holes in said fitting and a pair of inlets in the bottom of said cup, said inlet holes communicating respectively with said inlets, a flat valve seat mounted in said cup above the bottom thereof, a pair of arcuately shaped outwardly divergent ports in said valve seat, said ports communicating with said respective inlets, a valve plate slideable on said valve seat, circular groove means comprising a pair of arcuate grooves in the bottom of said valve plate, first adjacent inner ends of said arcuate grooves being arranged respectively to communicate with said arcuate inlet ports over varying areas of said respective inlet ports during sliding movement of said valve plate on said valve seat, an outlet hole in said fitting, an outlet in the bottom of said cup, said outlet communicating with said outlet hole, an outlet port in said valve seat and forming a mixing chamber, said outlet port communicating with said outlet, second adjacent outer ends of said arcuate grooves in said valve plate opposite said first adjacent ends being positioned for communication with said outlet port in said valve seat, and a member mounted on said cover in slideable contact with the upper surface of said valve plate and confining said valve plate for slideable movement on said valve seat.

11. A valve structure as defined in claim 10, said arcuate grooves each being about 180° arcuate grooves disposed opposite each other, the adjacent ends of said arcuate grooves being separated to prevent cross-flow from one of said arcuate grooves to the other.

12. A valve structure as defined in claim 10, including a pair of cavities in the lower surface of said valve seat, said arcuately shaped ports in said valve seat communicating with said cavities, a pair of upwardly extending resilient ring seals received in said respective inlets in the bottom of said cup and extending upwardly and received in said respective cavities and forming a pair of sealed passages between said inlet holes in said fitting and said arcuately shaped inlet ports in said valve seat, an elongated cavity in the lower surface of said valve seat, said outlet port in said valve seat communicating with said elongated cavity, said outlet in the bottom of said cup being of elongated shape matching said elongated cavity, and a resilient seal received in said outlet in the bottom of said cup and extending upwardly and received in said elongated cavity and forming a sealed passage between said outlet port and said outlet hole in said fitting, said valve seat being mounted on said resilient seals.

13. A valve structure as defined in claim 10, including a tiltable actuating pin extending into said cup above said valve plate, a groove in the upper surface of said valve plate positioned along the central axis of said valve plate, a latching member carried on the lower end of said actuating pin and disposed in said last-mentioned groove for slideable movement therein and permitting shifting of said valve plate laterally along said central axis of said valve plate in response to tilting of said pin, a central aperture in said cover, a rotatable sleeve mounted in said aperture, a pivot pin passing transversely through said sleeve and said actuating pin and positioned above said cover, said pivot pin permitting tilting of said actuating pin on said pivot pin and rotation of said actuating pin in response to rotation of said sleeve, said pivot pin being in slideable contact with the upper surface of said cover during rotation of said sleeve, said member mounted on said cover comprising a flange mounted at the lower end of said sleeve and within said cup, the upper surface of said flange being in slideable contact with the upper surface of said cover, said transverse pin and said last-mentioned flange disposed on opposite sides of said cover, preventing axial motion of said actuating pin.

14. A valve structure as defined in claim 12, including a tiltable actuating pin extending into said cup above said valve plate, a groove in the upper surface of said valve plate positioned along the central axis of said valve plate, a latching member carried on the lower end of said actuating pin and disposed in said last-mentioned groove for slideable movement therein and permitting shifting of said valve plate laterally along said central axis of said valve plate in response to tilting of said pin, a central aperture in said cover, a rotatable sleeve mounted in said aperture, a pivot pin passing transversely through said sleeve and said actuating pin and positioned above said cover, said pivot pin permitting tilting of said actuating pin on said pivot pin and rotation of said actuating pin in response to rotation of said sleeve, said pivot pin being in slideable contact with the upper surface of said cover during rotation of said sleeve, said member mounted on said cover comprising a flange mounted at the lower end of said sleeve and within said cup, the upper surface of said flange being in slideable contact with the upper surface of said cover, said transverse pin and said last-mentioned flange disposed on opposite sides of said cover, preventing axial motion of said actuating pin.

15. A valve structure as defined in claim 13, including a pair of vertically extending spaced arcuate flanges positioned diametrically opposite each other on said cover around said aperture therein and said sleeve, said arcuate flanges serving as bearings for said sleeve, a flange mounted on said actuating pin above said arcuate flanges, said flange on said actuating pin abutting the upper edges of said arcuate flanges and defining limits of tilting motion of said actuating pin, and limiting the lateral shifting of said valve plate along said central axis of said valve plate a controlled amount from an off-position of said valve wherein said arcuate grooves in said valve plate are out of registration with said arcuate inlet ports in said valve seat, and preventing flow through said inlet ports, to a full-on position wherein the inner ends of said arcuate grooves are in registration with one or both of said arcuate inlet ports and permitting a maximum combined flow through said inlet ports, with a varying combined volume of flow through said inlet ports permitted by said arcuate grooves at positions of said valve plate between said off-position and said full-on position, and said transverse pivot pin abutting the side edges of said arcuate flanges at the respective opposite limits of rotation of said sleeve and said actuating pin pivotally mounted on said sleeve, corresponding to extreme positions of rotation of said valve plate in a predetermined arc when said arcuate grooves in said valve plate are in registration with only one or the other of said arcuate inlet ports in said valve seat, permitting flow only through one or the other of said inlet ports, with varying proportions of flow through said respective inlet ports permitted by said arcuate grooves at angular positions of said valve plate between said extreme positions of rotation of said valve plate in said arc.

* * * * *